United States Patent [19]

Parker

[11] Patent Number: 5,140,466
[45] Date of Patent: Aug. 18, 1992

[54] OPTICAL MULTIPLEXER

[75] Inventor: Merle D. Parker, Oceanside, Calif.

[73] Assignee: Hughes Aircraft Company, Los Angeles, Calif.

[21] Appl. No.: 630,605

[22] Filed: Dec. 20, 1990

[51] Int. Cl.[5] .................... G02B 27/18; G02B 27/14
[52] U.S. Cl. .................................. 359/633; 359/634; 353/31
[58] Field of Search ............. 359/629, 633, 634, 637, 359/40; 353/31, 30, 33, 34, 37; 358/60

[56] References Cited

U.S. PATENT DOCUMENTS

| | | | |
|---|---|---|---|
| 4,850,685 | 7/1989 | Kamakura et al. | 359/634 |
| 4,864,390 | 9/1989 | McKechnie et al. | 358/60 |
| 4,904,061 | 2/1990 | Aruga | 359/33 |
| 4,909,601 | 3/1990 | Yajima et al. | 359/48 |
| 4,935,758 | 1/1990 | Miyatake et al. | 359/629 |
| 4,943,154 | 7/1990 | Miyatake et al. | 359/629 |
| 4,981,352 | 1/1991 | Tejima et al. | 359/40 |
| 4,995,702 | 2/1991 | Aruga | 359/638 |
| 5,028,121 | 7/1991 | Baur et al. | 353/31 |
| 5,054,910 | 10/1991 | Kozuki et al. | 353/34 |

*Primary Examiner*—Jon W. Henry
*Attorney, Agent, or Firm*—Terje Gudmestad; Wanda K. Denson-Low

[57] ABSTRACT

Optical multiplexer configurations are designed to minimize the volume of the multiplexer or minimize back focal distance of the lens of a multi-color projection system. The multiplexer employs three liquid crystal modulators under computer control to respectively and selectively transmit beams of three different colors for combination within the multiplexer which projects the combined modulated beams to a projection lens for focusing an image on a display screen. Optical light paths are chosen within the multiplexer by arrangement and configuration of mirrors and dichroic filters to direct the beams along folded paths within the multiplexer for combination and projection through a multiplexer exit window. For minimized volume of the multiplexer all beams are folded within the multiplexer, but two of the color beams are each folded twice in a single common plane which is perpendicular to a plane of folding of the third beam. For a multiplexer configuration providing a minimum back focal distance two of the beams are each folded in two mutually orthogonal planes while the third beam is not folded at all but is projected directly from the modulator to the projector lens together with the two other combined beams. In this minimum back focal length arrangement the point of combination of all three means is positioned close to the multiplexer exit window and is equidistant from each of the modulators.

26 Claims, 4 Drawing Sheets

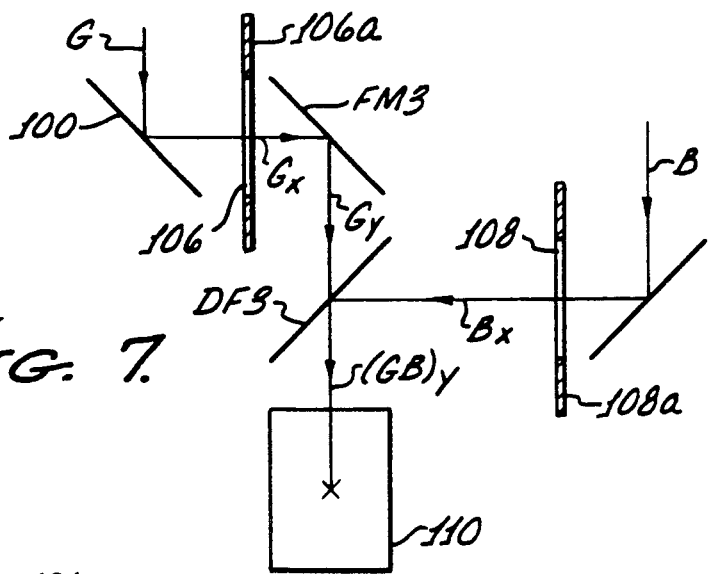
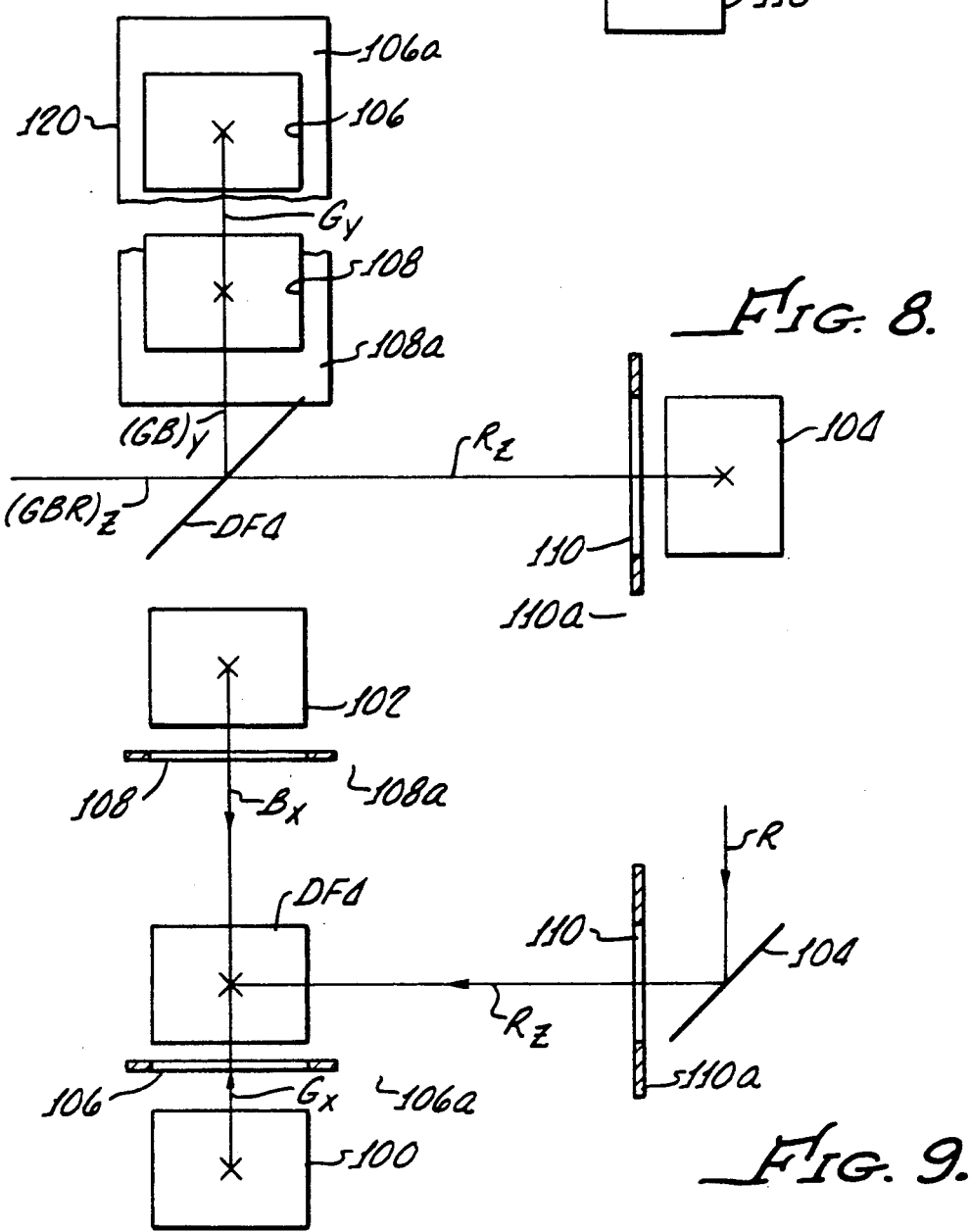
FIG. 7.
FIG. 8.
FIG. 9.

OPTICAL MULTIPLEXER

BACKGROUND OF THE INVENTION

1. Field of the Invention

The present invention relates to optical multiplexers and more particularly concerns a multiplexer for modulating and combining separate beams of different colors.

2. Description of Related Art

In very high brightness projection displays, where the intensity of light emitted by a display screen, such a cathode ray tube, is not adequate because of high ambient light conditions, a liquid crystal color display projection system may be employed. Such system embodies production of three high intensity, substantially monochromatic light beams of different color that are fed through three separate liquid crystal modulators of an optical multiplexer. The liquid crystal modulator apertures are controlled by a computer scanning control to individually modulate the respective monochromatic beams, which are combined within the multiplexer and projected as a single combined beam of appropriate color, bearing information imposed thereon by the computer controlled modulation. The combined beam is fed through a projection lens onto the back surface of a diffuse display screen to provide the appropriate display on the screen front surface.

Liquid crystal projectors of this type have been made by Victor Corporation of Japan (JVC), Seiko Epson Company Ltd., Sharp, Sanyo and Toshiba, among others and have been provided as a substitute for conventional cathode ray tube (television) display systems. To achieve a high definition, full resolution color picture on screen, the Victor Corporation and Seiko Epson Company liquid crystal projector identified as model LX-1000, employs a 250 watt halogen lamp and three 31.76 inch high density liquid crystal display (LCM) panels each with 211,200 pixels (440 ×480) for a total of 633,600 pixels, and a system of lenses and dichroic mirrors. The dichroic mirrors separate white light emitted by the halogen lamp into three colors, red, blue and green. After passing through the LCM panels, the monochromatic light beams are combined into one beam by a dichroic prism and then projected through a set of lenses onto the screen. However, prior liquid crystal projectors are not adapted for use in areas where restricted volume is a significant limitation. In prior liquid crystal projectors, the several monochromatic light beams are folded in order to combine all three, but LCM projectors of the past have employed beam folding paths all lying in a single plane.

Space and weight considerations impose primary design constraints in those environments where a high ambient brightness occurs, such as in an aircraft cockpit for example. Volume of optical multiplexers of previous liquid crystal projectors is too great for aircraft cockpit use because the multiplexer packages are too bulky. In some environments it is necessary to minimize overall volume of the multiplexer, whereas in other environments space limitations may constrain the multiplexer to provide a minimum back focal distance for the projection system, with less constraint provided by overall volume. The practice of folding all three beams of the optical multiplexer in a single plane has resulted in multiplexer packages that fail to satisfy space criteria.

Accordingly, it is an object of the present invention to provide an optical multiplexer that avoids or minimizes above-mentioned problems.

SUMMARY OF THE INVENTION

In carrying out principles of the present invention, in accordance with a preferred embodiment thereof, liquid crystal modulators are mounted in first, second and third planes of which one plane is orthogonal to the other two, with the modulators arranged to respectively receive and modulate individual ones of first, second and third input beams of mutually different colors to provide first, second and third modulated beams. The multiplexer comprises beam folding and combining means mounted between the modulators for combining all of the means to provide a combined beam projected outwardly of the multiplexer from a beam combination point. The beam folding and combining means include optical means for folding and modulating the beams in two mutually orthogonal planes. In one embodiment two of the beams are folded in a first plane, and the third beam is folded in a second plane perpendicular to the first plane. In a second embodiment each of two of the modulated beams is folded in two mutually orthogonal planes.

BRIEF DESCRIPTION OF THE DRAWINGS

In the accompanying drawings:

FIG. 7 is a front view of components of the three dimensional optical multiplexer of FIG. 6;

FIG. 8 is a view from the left of the optical multiplexer of FIG. 6; and

FIG. 9 is a top view of the three dimensional optical multiplexer of FIG. 6.

DESCRIPTION OF THE PREFERRED EMBODIMENT

Figure 1:
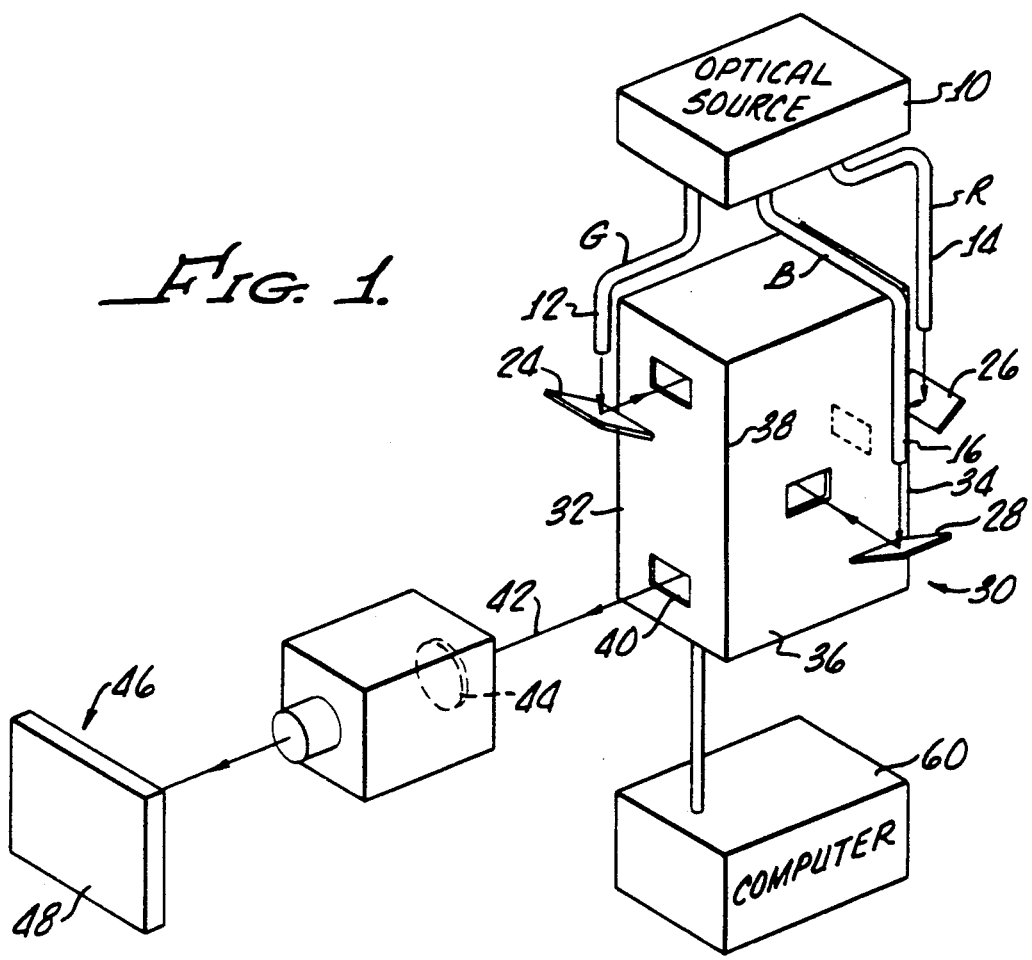
FIG. 1 is a simplified block diagram of a high brightness liquid crystal projection system embodying an optical multiplexer.

Functionally illustrated in FIG. 1 is a multi-color liquid crystal projector display system particularly adapted for use in conditions of high ambient light and constricted space. A high powered optical source 10, such as an arc lamp, employs conventional dichroic or other color filters to produce three high intensity, substantially monochromatic light beams indicated in FIG. 1 as G, R and B, representing, for example, green, red and blue beams respectively. The respective beams are transmitted by reflective mirrors or fiber optic cables 12, 14, 16 to respective input mirrors 24, 26, 28, which are positioned to reflect the individual beams to a three dimensional optical multiplexer 30 in directions normal to respective input faces 32, 34, and 36, which are at three adjacent sides of a multiplexer support frame 38. The optical multiplexer 30, by means of folding mirrors and dichroic filters to be described below, directs the incoming monochromatic beams along various optical paths so as to combine the beams and provide a combined exiting beams, projected from an exit window 40 along an output path 42. The combined beam is transmitted to a projection lens 44 which focuses the beam upon the back of a diffusing projection screen 46 to provide on the front face 48 of the screen the desired multi-color display. The optical source 10, projection lens 44, and screen 46 are shown displaced from the multiplexer and from each other for clarity of illustration, but, preferably are positioned closely adjacent the multiplexer and each other or may be within the same housing. The present invention minimizes the overall size of the projection system by selected design of the configuration of the multiplexer, which forms a major part of the physical dimensions of the system.

Figure 2:
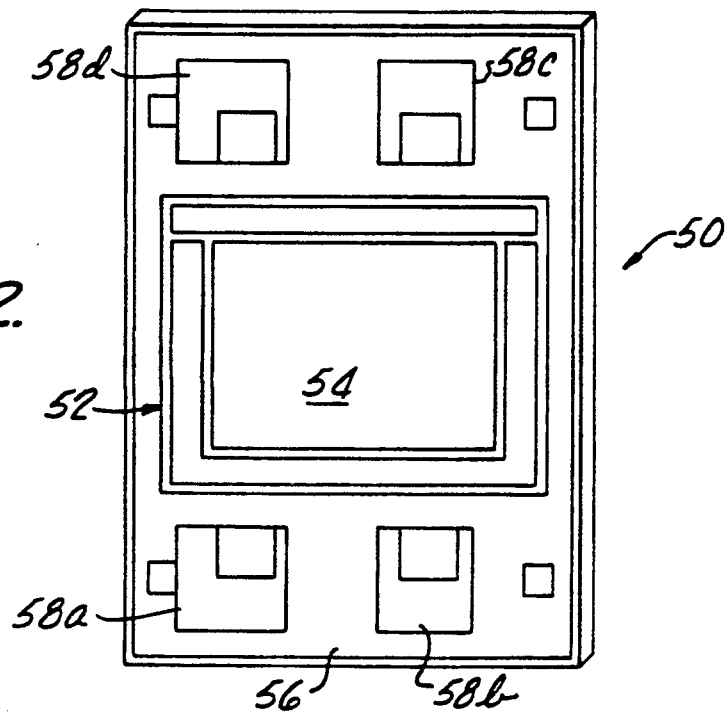
FIG. 2 illustrates a single liquid crystal modulator of the type employed in the multiplexer of FIG. 1.

On each of the faces 32, 34, 36 of the optical multiplexer is mounted a high resolution liquid crystal display module (LCM), of which one is illustrated in FIG. 2. The liquid crystal module, generally illustrated in FIG. 2 at 50, is a commercially available system. Liquid crystal modules employed in the present invention have been obtained from Seiko Epson, having an array of 440 by 480 pixels of 65×80 micrometers with the array being mounted in a circuit board of 3.5×2.6 inches. The aperture of this LCM has an aspect ratio of 3:4 and a diagonal size of 1.85 inches. Other types and sizes of LCM's are available and can be used in the practice of this invention. The liquid crystal module comprises a liquid crystal structure 52, having an aperture or active area 54, mounted on a circuit board 56 that carries control electronics 58a, 58b, 58c and 58d thereon. Each liquid crystal module is mounted at the corresponding face of the multiplexer for bidirectional adjustment in the plane of the LCM and rotational adjustment about an axis perpendicular to the plane of the LCM. These adjustments enable precise registration of the combination of all three monochromatic beams. The liquid crystal module includes a number of individual areas or pixels, such as 440×480 for example, which are individually controlled by signals applied from a computer 60 to the LCM electronics. The computer control effects a scanning action, that is synchronized for all three LCM's, of the rectangular array of individual LCM pixels. This provides a rectangular raster type san, for example, of successive uniquely controlled individual pixel. The control may turn the individual pixel on or off, or may be operable to provide variable intensity (different Gray scale levels) transmission of the beam impinging on the active area of the LCM. Typically the active area of each LCM is approximately one inch by one and one-half inches, having a shape dictated by the shape of the projection screen. A rectangular active area or aperture is employed for a projection screen of comparable rectangular configuration. The longer dimension of the LCM aperture is perpendicular to the longer dimension of its circuit board, thereby imposing a constraint on geometry of the multiplexer, as will be explained below.

Each incoming light beam, such as the green beam 12 reflected to multiplexer side 32 from input mirror 24, has a cross section at least as large as the active area of the LCM so that the entire active area is illuminated by the incoming beam. Each of the green, red and blue beams is fed to individual liquid crystal modulators on the individual surfaces or sides 32, 34, 36 of the multiplexer in basically the same manner. Thus, with the illustrated arrangement, the three LCM's are positioned at three different sides of a rectangular box and each receives a monochromatic input beam directed along an input path normal to the plane of the LCM.

Within the optical multiplexer is an arrangement of folding mirrors and dichroic filters that sends the incoming beams along folded optical paths and combines all three beams, which are then projected from multiplexer exit window 40 along beam path 42.

Figure 4:
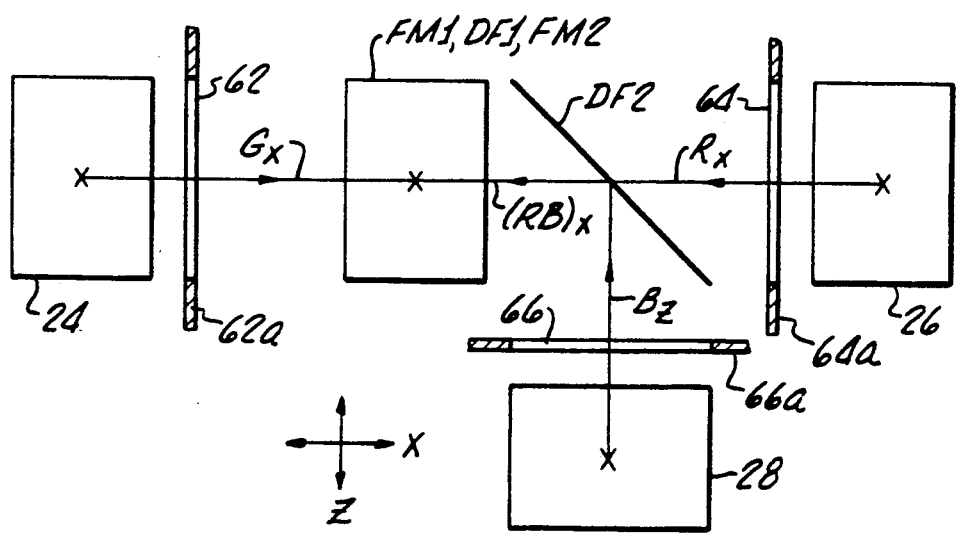
FIG. 4 is a top view showing the geometrical arrangement of the components of the multiplexer of FIG. 3.
Figure 5:
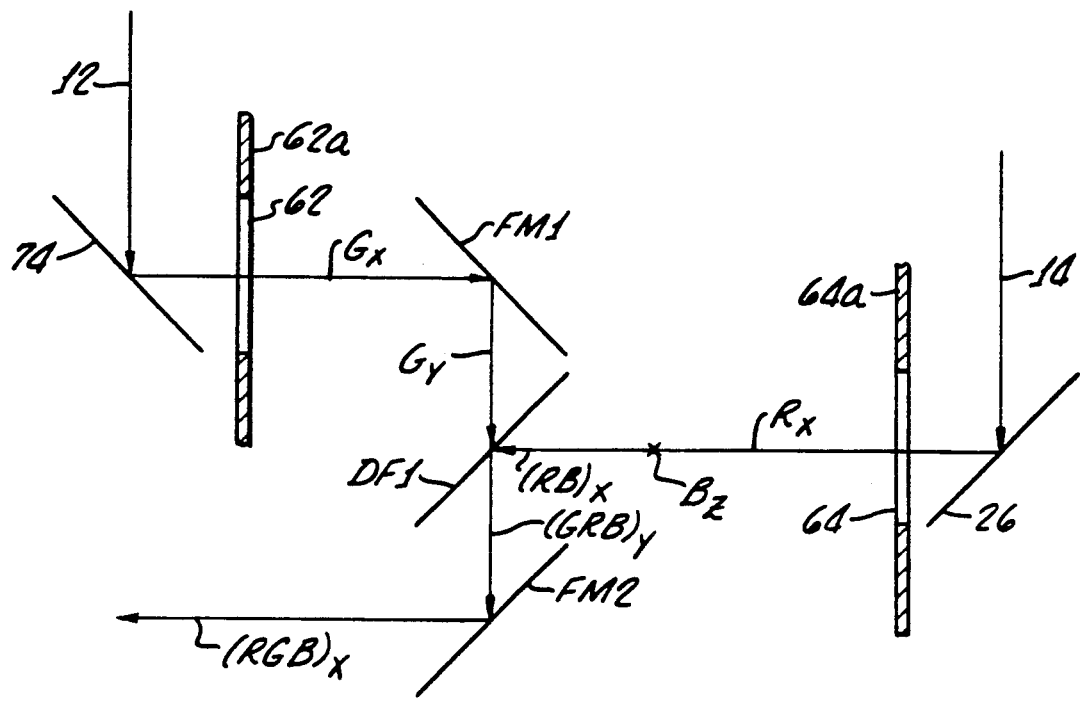
FIG. 5 is a front view of the geometrical arrangement of the components of the multiplexer of FIG. 3.

It is the specific geometric arrangements of these mirrors and dichroic filters within the multiplexer, and, particularly, the folding of beam paths in two different planes, from which are derived the benefits of the present invention. This geometric arrangement for a multiplexer having an overall minimized volume is illustrated in FIGS. 3, 4, and 5.

Figure 3:
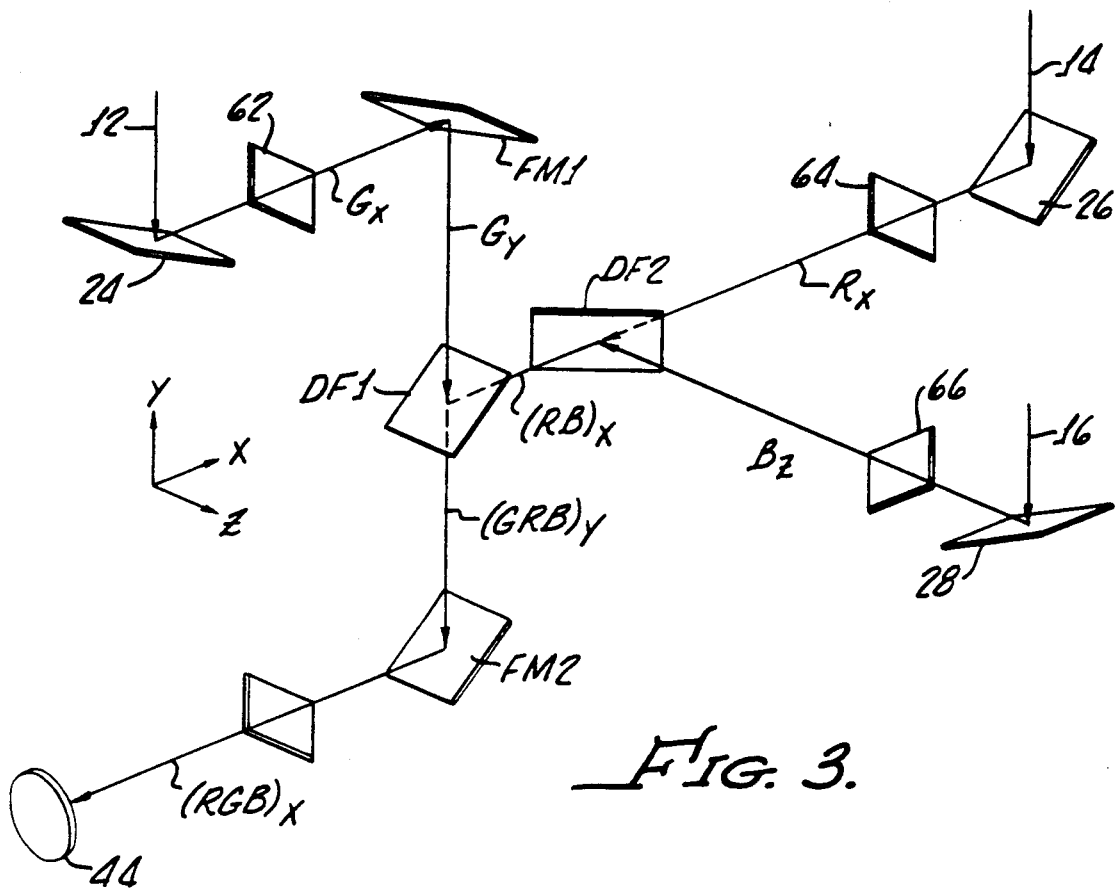
FIG. 3 is a simplified schematic line drawing showing the spatial configuration and positioning of the multiplexer elements that define folding light paths of a first embodiment of a three dimensional optical multiplexer of minimum volume.

For reference purposes a three dimensional coordinate system X, Y, Z is illustrated in FIG. 3 to identify the several mutually orthogonal coordinate directions which will be employed in explaining configuration of the multiplexer. For purposes of clarity of illustration and explanation, structural support elements and the several circuit boards that mount the LCM's are omitted from the showing of FIG. 3, which shows only the active areas 62, 64, 66 of the three individual liquid crystal modulators. These LCM's respectively receive the several monochromatic light beams from optical source 10 via multiplexer input mirrors 24, 26, and 28. In this drawing the several components of the individual beams and the lengths of the various segments of optical paths within the multiplexer are identified by a letter (R,G or B) indicating the individual beam color, with a subscript (x, y or z) indicating the direction of that particular beam path leg. Thus the input green beam 12 is fed in +X direction to LCM active area 62 of the green LCM via input mirror 24. The input red beam 14 is fed in −X direction to the active area 64 of the red LCM via input mirror 26, and the blue beam 16 is fed in −Z direction to the active area of the blue LCM active area 66 via input mirror 28. The incoming green beam passes through the green LCM where it is modulated under the computer control and is fed along a first green optical path leg, indicated at $G_x$, to a first folding mirror FM1. The length of the optical path of the green beam between the LCM 62 and its point of impingement upon mirror FM1 is denoted in the drawing as $G_x$. The green beam is folded, being reflected along the path indicated at $G_y$ by the mirror FM1 to a dichroic filter indicated at DF1. The length of the optical path of the green beam between mirror FM1 and the dichroic filter DF1 is indicated at $G_y$, denoting the fact that along this path is projected the green beam in the −Y direction. Thus the green beam is folded in the X,Y plane by mirror FM1.

The red beam is input to the multiplexer through liquid crystal module 64 and is directed along path $R_x$ to a second dichroic filter DF2, the distance between LCM 64 and DF2 being denoted as $R_x$, which as explained above represents the length of the optical path of the red beam projected along the X axis.

The blue beam is fed to blue LCM 65 from input mirror 28 along an optical path leg $B_z$ to the second dichroic filter DF2. Reference $B_z$ denotes the optical length of the blue beam path between the blue LCM 66 and the second dichroic filter DF2. The direction of this path is of course parallel to the Z axis.

The blue beam is reflected by dichroic filter DF2 parallel to the X axis to propagate, together with the red beam, along an optical path leg indicated at $(RB)_x$. The red beam $R_x$ passes through dichroic filter DF2 where it joins the blue beam reflected by the filter along the path leg $(RB)_x$ to the first dichroic filter DF1. Accordingly the designation $RB_x$ indicates the optical path length of the combined red and blue beams parallel to the X axis between dichroic filter DF2 and their point of impingement upon dichroic filter DF1.

The combined red and blue beam $(RB)_x$ is reflected parallel to the Y axis by dichroic filter DF1 along an optical path leg indicated as $(GRB)_y$ to an exit folding mirror FM2. The green beam $G_y$ passes through dichroic filter DF1 to combine with the combined red and blue beams reflected by DF1 so that the beam on path leg $(GRB)_y$ is the combination of all three beams. Note that the combination of all three beams first occurs at the output side of first dichroic filter DF1. The three combined beams $(GRB)_y$ are reflected parallel to X by the exit mirror FM2 to provide the combined exiting beam $(GRB)_x$ which passes from the exit window 40 of the multiplexer to the projection lens 44.

As can be seen from inspection of FIG. 3, both the green beam $G_x$, $G_y$ and the red beam $R_x$, $(RB)_x$ and $(GRB)_y$ are folded in the X,Y plane, whereas the blue beam B, $(RB)_x$ and $(GRB)_y$ is folded in the X, Z plane and also in the X, Y plane. The beams are not all folded in the same plane. The initial folding plane X Z of the blue beam is perpendicular to the folding plane X,Y of the other two beams. This arrangement allows a more compact volume of the multiplexer because it enables a closer positioning of the several LCM circuit boards with respect to one another, as can be seen in FIGS. 4 and 5.

FIGS. 4 and 5 show respective top and front views of the elements of the multiplexer. Also shown in these figures are the circuit boards 62a, 64a and 66a which respectively mount the green liquid crystal module 62, the red liquid crystal module 64 and the blue liquid crystal module 66. It is in part the size these circuit boards, together with the size of the several mirrors and dichroic filters, that forms a constraint on the overall minimum volume. In the embodiment disclosed here, the number of elements or pixels along one axis of the LCM is greater than the number along the other axis so that the active area of each LCM is of a rectangular rather than square configuration. Of course a square configuration may be employed alternatively for the LCM aperture. However, even with such a square configuration the substrate on which the LCM is mounted generally will be rectangular to accommodate electric drive circuitry. The long axes of LCM's 62,64 of FIGS. 3, 4 and 5 extend in the Z direction of LCM 66 in the X direction, whereas the long axes of the circuit boards all extend in the Y direction. Note that in FIG. 5 the blue liquid crystal module and its circuit board 66, 66a have been removed for clarity of illustration.

The described geometric arrangement of the minimum volume multiplexer of FIGS. 3, 4 and 5 satisfies several conditions or requirements. These are as follows: (a) the volume required for the three color device is minimum; (b) no image of any of the LCM is rotated with respect to any other or with respect to the screen; (c) the optical path length from any point of the fully combined three color beam to any single color LCM is identical for all three colors. This latter criterion may be observed by noting that the three beams are first combined at their intersection at DF1, from which is first produced the three combined colors $(GRB)_y$. The parts are arranged so that optical path length $G_x$ plus the optical path length $G_y$ is equal to the sum of optical path length $R_x$ plus $(RB)_x$. The red beam path length from its LCM 64 to the point of combination of all three at DF1 is equal to the total optical path length of the green beam from its LCM 62 to DF1. Similarly each of these optical path lengths of the green and the red is individually equal to the sum of $B_z$ plus $(RB)_x$, which is the total optical path length of the blue beam from its LCM 66 to the first dichroic filter DF1. This condition of equality of optical path lengths is desired to ensure that all beams are equally focused on the screen by the projection lens. All beams follow the one common path from DF1.

To make the most efficient use of the LCM's a congruent rectangular configuration of the screen 48 is used with the long axis (the longer dimension) of each LCM active area being parallel with the long axis of the screen.

Each LCM is adjustably mounted to the structure of the multiplexer, as previously mentioned, to allow all three LCM's to be registered together so that corresponding pixels from each of the three will overlay each other on the projection screen. The requirement for adjustment of the LCM mounting, with of course means adjustment of each LCM together with the board on which it is mounted, establishes a minimum spacing between adjacent liquid crystal modules, which spacing is required to avoid possible interference between adjacent modules when one is adjusted relative to the others.

Because of diffraction characteristics of the light, the three beams cannot be collimated within the optical multiplexer. Therefore, to achieve color correction in the projected three color image, the optical path length from each LCM to the back focus of the projection optical system must be equal. This is the reason for making the path length form each LCM to the point at which all three beams are first combined, namely DF1, equal, as discussed above.

To meet these constraints the described minimum volume multiplexer is arranged as illustrated in the drawings. The red and blue LCM's 64 and 66, in Y,Z and X,Z planes, respectively, are positioned at right angles to each other with their long axes both parallel to the Z and Y planes respectively. Both are equidistant from the dichroic filter DF2, which combines their respective beams. As can be seen in FIGS. 3 and 3, the planes of the apertures of the red and blue LCM's 64 and 66 are perpendicular to the system axes X and Z respectively. The third or green LCM 62 is positioned facing and parallel to the red LCM 64 with its aperture offset in the +Y direction from the aperture of red LCM 64 by a minimum of one aperture height in the +Y direction, as can be seen in FIG. 5.

As can be seen in FIG. 5, the described configuration of multiplexer elements allows the rear elements, behind the combined exiting beam $(RGB)_x$ to be actually nested behind (in the +X direction) the green LCM 62, which further shortens the overall system in the X direction.

Illustrated in FIGS. 6, 7, 8 and 9 is the geometrical arrangement and configuration of a modified form of three dimensional optical multiplexer in which the back focal distance of the lens is minimized. The back focal distance is the distance from the projection lens 44 to the respective liquid crystal modules. Because in this multiplexer, just as in the multiplexer previously described, the optical path length from each individual liquid crystal module to the point at which all three beams are first combined is the same for each of the three monochromatic beams, the back focal length or distance is minimized by decreasing each of those distances and by arranging the components so that the distance from the point of first combination of all three beams to the projection lens is also minimized. The latter is accomplished in part by arranging the final combining component to be as close as possible (as measured along the optical path) to the exit window of the multiplexer.

Figure 6:
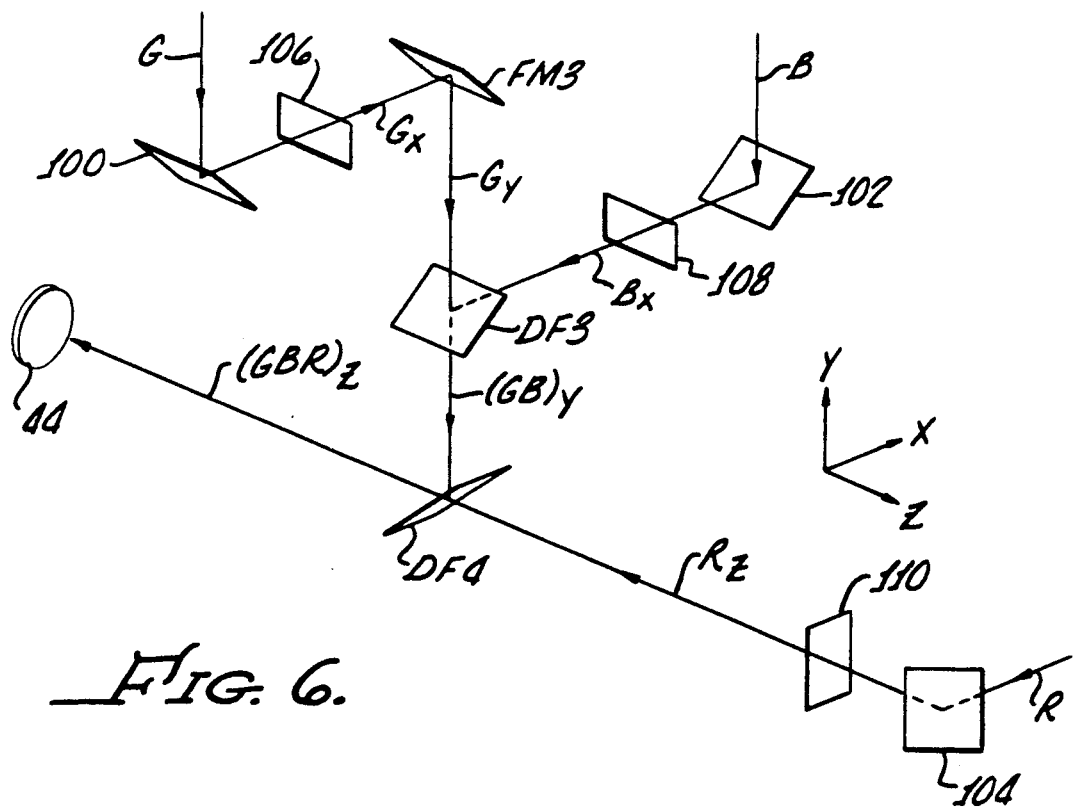
FIG. 6 is a simplified line drawing showing spatial configuration and positioning of elements defining the several folding optical paths of a three dimensional optical multiplexer in which back focal distance is minimized.

In the arrangement of FIGS. 6 through 9 the several monochromatic light beams are input along paths indicated as G (green), B (blue), and R (red) to green, blue and red input mirrors 100, 102 and 104 respectively (see FIG. 6). The input mirrors reflect the respective beams through the apertures of green, blue and red liquid crystal modules 106, 108, and 110 respectively in respective +X, −X and −Z directions. The modules are mounted on respective ones of circuit boards 106a, 108a and 110a (FIGS. 7, 8 and 9). It may be noted that the long axes of the green and blue LCM's 106 and 108 are parallel to Z (and the long dimension of their respective circuit boards and therefore parallel to Y), whereas the long dimension of the red liquid crystal module 110 is parallel to Y, and the long dimension of its circuit board is parallel to X. The green beam is input from mirror 100 through green LCM 106 along a first optical path leg indicated at $G_x$ (using the notation convention previously described so that $G_x$ denotes the length of the green beam optical path leg from LCM 106 to a first folding mirror FM3 parallel to the X axis). The green beam is reflected form FM3 along a Y direction path leg of length $G_y$ to a first dichroic filter DF3, and thence travels through the filter DF3 along path leg $(GB)_y$ to a second dichroic filter DF4 from which it is reflected along an exit path $GBR_{(z)}$ through the exit aperture of the multiplexer to projector lens 44. The blue beam is input form mirror 102 through the blue liquid crystal module 108 along a first optical path leg $B_x$ to the dichroic filter DF3 from whence it is reflected along optical path leg $(GB)_y$ together with the green beam that is transmitted through the dichroic filter DF3. The red beam is input from the input mirror 104 through red LCM 110 along a first optical path leg $R_z$ to the dichroic filter DF4. The red beam passes through the dichroic filter DF4 to be combined in path leg $(GBR)_z$ with the combined beam $(GB)_y$ that is reflected from DF4 in the −Z axis direction through the exit window of the multiplexer.

The arrangement illustrated in FIG. 6 is employed primarily to minimize the back focal distance of the projector lens, that is, to minimize the optical path length between a rearmost element of the lens 44 and the active elements, the liquid crystal modulators, of the three dimensional optical multiplexer. A secondary benefit of the arrangement of FIGS. 6 through 9 is to decrease volume required by the multiplexer. An additional benefit of the described arrangements is that selection of the described light paths enables optimization of transmission of any color because optical coating efficiency on the dichroic filters and folding mirrors can be a determining factor in selecting the order of combining colors. For example, if one coating is less efficient in reflection for a given color, such a color can be transmitted along a path having no reflection, as is the red beam in FIGS. 6–9. The described arrangements allow any color to be provided at any input. The minimized back focal length and volume enables this arrangement to be useful in projection displays where volume and weight are significant factors, and, importantly, where the instrument length in the direction of the projection axis must be minimized because of configuration and dimensions of the space available for mounting the projection system.

The configuration of FIGS. 6 through 9 satisfies a number of conditions, including (a) a requirement of compact space for the multiplexer; (b) maintenance of the same orientation of images of the several LCM's with respect to each other and with respect to the screen; (c) equality of optical path lengths for each of the colors form any point in the combined output beams to any one of the LCM's and (d) minimized distance from the rear element of the projection system, namely the lens, to the individual liquid crystal modules.

It may be noted that the green and blue beams are both folded in two different planes, X, Y and Y, Z whereas the red beam is not folded at all. Therefore, to achieve the necessary identify of orientation of the images of all three LCM's in the combined beam along path leg $GBR_{(z)}$ it is necessary to physically orient the long dimension of the aperture of the red LCM 110 parallel to Y and the long dimension of the apertures of green and blue LCM's 106 and 108 parallel to Z. Because the red beam follows an optical path that is not folded, the long axis of the image of the red LCM aperture is always parallel to Y. The path of the green beam causes the long axis of the image of the green LCM aperture in optical path $G_x$ to be parallel to Z, and in optical path $G_y$ its long axis is still parallel to Z. However, on reflection from dichroic filter DF4 the image of green aperture 106 is rotated about X so that its long axis, as it leaves dichroic filter DF4, is parallel to Y, thus being parallel to the long axis of the red beam and in registration therewith.

Similarly, the long axis of the image of the blue LCM is initially parallel to Z along path leg $B_x$. Upon reflection from dichroic filter DF3 this long axis is still parallel to Z, as it traverses path leg $(BG)_y$. Again, like the red image, this blue image is rotated about X to have its long axis parallel to Y upon reflection from the second dichroic filter DF4. Accordingly, long axes of all three images are parallel and in registration in the exiting beam path $(GBR)_z$.

As mentioned above, to achieve color correction in the projected three color image, the optical path length from each LCM to the back focus of the projection optical system must be equal. Accordingly, in the arrangement of FIGS. 6 through 9 the various elements are positioned so that the optical path leg $R_z$ equals the sum of $G_x + G_y + (GB)_y$, which is also equal to the sum of $B_x + (GB)_y$. Again, as in the previous embodiment, the optical path length from the first point of combination of all three beams, namely the dichroic filter DF4 to each of the respective LCM's 106, 108 and 110 are all equal to one another.

It may be noted that in this arrangement, as in the earlier embodiment, not all of the beams pass through the same number dichroic filters. Those beams that travel through a dichroic filter generally travel a slightly shorter optical path length, although the actual distances may be the same. If deemed necessary or desirable, this difference in optical path lengths may be readily compensated by changing the actual distance of an appropriate one of the liquid crystal modules so that all three optical path lengths are equal.

A number of constraints apply to the embodiments of FIGS. 6 through 9. The short axes of LCM apertures 106 and 108, as previously mentioned, are aligned with Y, whereas the short axis of the red LCM aperture 110 is aligned with X. Stated otherwise, the long axis of aperture 110 is parallel t the short axes of apertures 106 and 108. The green aperture 106 is offset by at least one aperture width (short axis) along the Y axis from the blue aperture 108 (see FIG. 7) which in turn is offset along Y from the red aperture 110. Again, as in the earlier embodiment, folding occurs not in just one plane, but in two mutually orthogonal planes. In the embodiment of FIGS. 6 through 9 each of the green and blue beams is folded both in the X, Y plane (by FM3) and in the Y, Z plane (by DF4). The blue beam is folded in the X, Y plane by dichroic filter DF3 and folded in the Y,Z plane by dichroic filter DF4. The red beam simply passes through the dichroic filter DF4 to be combined with the blue and green beams, but is not folded at all, passing through the exit window along the output axis of the multiplexer.

As can be seen in FIG. 8, dichroic filter DF4 is positioned relatively close to the leftmost edge 120 of the circuit board 106a that mounts the green LCM 106. The leftmost edge of circuit board 106a is that edge that is closest (in Z direction) to the exit window of this multiplexer. With the described orientation of the circuit board 106a, with its long dimension parallel to Y, the dichroic filter DF4 may be positioned close to the exit window (toward the left as viewed in FIG. 8) and thus closer to the projection system lens 44. Note further that the length of the optical path of the combined beams from the point (at filter DF4) of first combination of all three within the multiplexer to the exit window is minimized by this positioning of the final combining filter DF4. In the arrangement of FIGS. 3 through 5, on the other hand, the combined beam, after combination in DF1, passes along path leg $(GRB)_y$ for a final folding by FM2 to exit in the $-X$ direction. Thus the arrangement of FIGS. 6 through 9 provides a smaller back focal length than does the arrangement of FIGS. 3 through 5.

In the arrangement of FIGS. 6 through 9 one constraint on size is the minimum distance needed between the folding mirror FM3 and green LCM 106. Further, LCM 108 (blue) must be offset in $-Y$ from green LCM 106 by at least one aperture width (smaller dimension), as can be seen in FIG. 7, and similarly the red LCM 110 is offset downwardly in $-Y$ from the blue LCM 108. The direction position of the red LCM 110 in the Z direction is established by the need to have the path leg $R_z$ equal to $G_x + G_y + (GB)_y$ which is equal to $B_x + (GB)_y$.

As can be seen in the drawing, beam folding effected by all mirrors and dichroic filters is accomplished by folding at an angle of 90°. It will be readily understood that the beam colors may be interchanged without departing from principles of the invention. Thus the red and green or blue and green or red and blue beams may be interchanged, or some combination of such interchanges may be used.

The projection lens is a precision projection lens, which is a specific embodiment magnifies the image to about six inches on a side from the one and one-half by one inch size of the apertures. If the path lengths are not equal, magnification may be different for each of the colors, and the different colors will smear at the corners. For a minimum back focal length embodiment an optical multiplexer may have a dimension of about $5\frac{3}{4}'' \times 5\frac{3}{4}'' \times 6''$, whereas the minimum volume arrangement of FIGS. 3 through 5 may have one long dimension so that it would be about $5'' \times 4'' \times 7\frac{1}{2}''$. These dimensions are based on the specific size of LCM described herein.

It will be seen that there have been disclosed configurations of three dimensional optical multiplexer employing optical path folding in plural planes and providing both minimum volume and minimum back focal length, corresponding orientation of modular images, equal path lengths of the several beams, and minimum back focal distance of the projection system.

What is claimed is:

1. A multiple beam optical multiplexer comprising:
   a multiplexer having first, second and third mutually orthogonal faces,
   first, second and third modulators mounted at respective ones of said faces in first, second and third planes of which one plane is orthogonal to the other two and adapted to respectively receive and modulate individual ones of first, second and third input beams, said input beams comprising light of mutually different colors,
   beams combining means mounted within said frame for combining all of said beams to form a combined beam projected outwardly of said multiplexer from a beam combination point within said frame,
   said beam combining means comprising optical means for transmitting modulated beams from each of said modulators to said beam combination point along optical path lengths that are substantially equal to one another and folded in three dimensions.

2. The multiplexer of claim 1 wherein said combination point is a point within the multiplexer at which all of said beams come together, and wherein said combined beam is projected along a path that is linear from said combination point.

3. The multiplexer of claim 1 wherein each said modulator includes a modulator aperture that is offset from the apertures of each of the other modulators by a selected dimension of at least one of said apertures.

4. The multiplexer of claim 1 wherein said beam combining means comprises a mirror for bending said first beam to provide a first optical path length $G_x$ of said first beam from said first modulator to said mirror and a second optical path length $G_y$ of said first beam to said second beam, the optical path length $B_x$ of said second beam from said second modulator to said first beam being equal to the sum of the length of said first and second optical path lengths.

5. The multiplexer of claim 4 including dichroic filter means for directing said first and second beams to said beam combination point along a fourth optical path length $(GB)_y$ and wherein a fifth optical path length $R_z$ from said third modulator to said combination point equals the sum of optical path lengths $G_x + G_y + (GB)_y$.

6. The multiplexer of claim 1 wherein said beam combining means comprises a first mirror and first and second dichroic filters, said first mirror being positioned for bending said first beam to provide a first optical path length $G_x$ of said first beam from said first modulator to said mirror, and a second optical path length from said first mirror to said first dichroic filter, said second dichroic filter being positioned for bending said second beam to provide a third optical path length $B_z$ from said second modulator to said second dichroic filter and a fourth optical path length from said second dichroic filter to said first dichroic filter, the sum of first and second path lengths being equal to the sum of said third and fourth path lengths.

7. The multiplexer of claim 6 wherein said first mirror is positioned to bend said first beam in a first plane, and wherein said second dichroic filter is positioned to bend said second beam in a second plane that is perpendicular to said first plane.

8. The multiplexer of claim 1 wherein said projected beam is adapted to illuminate a projection screen spaced from said multiplexer, and wherein each modulator has an elongated aperture having a longitudinal axis, and wherein all of said longitudinal axes are substantially parallel to each other and to the longitudinal axis of said projection screen.

9. The multiplexer of claim 1 wherein said beam combining means includes dichroic filter means for combining said first and second beams in optical beam paths to provide a dual beam, said first and second modulator lying in mutually orthogonal planes and having apertures equally spaced from said dichroic filter means along said optical beam paths.

10. The multiplexer of claim 9 including second dichroic filter means at said beam combination point for combining said dual beams with said third beam.

11. An optical multiplexer as in claims 1, 4, 6 or 9 further comprising light source means for generating and transmitting to said modulators said first, second and third input beams, a display screen for receiving and displaying said combined beam, and a projection lens interposed between said display screen and said beam combining means.

12. An optical multiplexer comprising:
first, second and third optical modulators mounted in respective ones of first, second and third planes, of which one plane is orthogonal to the other two, said modulators being adapted to respectively receive and modulate individual ones of first, second and third input beams of mutually different colors to provide first, second and third modulated beams, and
beam folding means mounted between said modulators for combining all of said beams to form a combined beam projected outwardly of said multiplexer from a beam combination point,
said beam folding and combining means comprising optical means for folding said modulated beams in two mutually orthogonal planes.

13. The multiplexer of claim 12 wherein said beam folding means comprises means for folding said first and second modulated beams in a first plane, and means for folding said third modulated beam in a second plane perpendicular to said first plane.

14. The multiplexer of claim 12 wherein said beam folding means comprises means for folding each of said first and second modulated beams in each of two mutually orthogonal planes.

15. The multiplexer of claim 12 wherein said beam folding means comprises means for folding at least one of said modulated beams in at least two mutually orthogonal planes.

16. The multiplexer of claim 12 wherein said beam folding means comprises optical means for transmitting said modulated beams from each of said modulators to said beam combination point along optical path lengths that are substantially equal to each other.

17. The multiplexer of claim 12 wherein said combination point is a point within the multiplexer at which all of said beams come together, and wherein said combined beam is projected along a path that is linear form said combination point.

18. The multiplexer of claim 1 wherein each modulator is a liquid crystal modulator having a rectangular modulator aperture with long and short axes and wherein the long axes of all said apertures lie in planes parallel to a common plane.

19. The multiplexer of claim 12 including a mirror for bending said first beam to provide a first optical path length $G_x$ of said first beam from said first modulator to said mirror and a second optical path length $G_y$ of said first beam from said mirror to said second beam, a third optical path length $B_x$ of said second beam from said second modulator to said first beam being equal to the sum of the lengths of said first and second optical path lengths $(G_x+G_y)$.

20. The multiplexer of claim 19 including dichroic filter means for directing said first and second beams to said beam combination point along a fourth optical path length $(GB)_y$ and wherein a fifth optical path length $(R_z)$ from said third modulator to said combination point equals the sum of said third $(B_x)$ and fourth $(GB)_y$ optical path lengths.

21. The multiplexer of claim 20 wherein said fifth optical path length $R_z$ equals the sum of said first $(G_x)$, second $(G_y)$ and fourth $(GB)_y$ optical path lengths.

22. The multiplexer of claim 12 wherein said projected beam is adapted to illuminate a projection screen spaced from said multiplexer, and wherein each modulator has an elongated aperture having a longitudinal axis, and wherein all of said longitudinal axes are oriented similarly to each other and to the longitudinal axis of said projection screen.

23. The multiplexer of claim 12 including dichroic filter means (DF2) for combining said first $(R_x)$ and second $(B_z)$ beams to provide a dual beam $(RB)_x$, said first and second modulators lying in mutually orthogonal planes and having apertures equally spaced from said dichroic filter means.

24. The multiplexer of claim 23 including second dichroic filter means (DF1) at said beam combination point for folding said dual beam and combining it with said third beam $(G_y)$.

25. An optical multiplexer having mutually orthogonal X, Y and Z axes, said multiplexer comprising:
first and second liquid crystal modulators mounted in first and second mutually parallel and spaced planes respectively,
a third liquid crystal modulator mounted adjacent said first and second modulators in a plane perpendicular to said first and second planes, said modulators being adapted to receive first, second and third input beams of mutually different colors respectively and to pass first, second and third modulated beams of said colors respectively,
first dichroic filter means (DF1),
first folding mirror means for reflecting said first modulated beam along the Y axis to and through said first dichroic filter means,
second dichroic filter (DF2) means for transmitting said second modulated beam to said first dichroic filter means for reflection thereby along the Y axis, said second dichroic filter means being positioned to reflect said third modulated beam along the X axis in coincidence with said second modulated beam as combined second and third modulator beam, said first dichroic filter means being configured and arranged to transmit said first modulated beam along the Y axis and to reflect said combined second and third modulated beams along the Y axis to provide a three color combined beam along the Y axis, and a second folding mirror for reflecting said three color combined beam along the Y axis.

26. An optical multiplexer comprising:

first and second liquid crystal modulators mounted in first and second mutually parallel and spaced planes respectively, a third liquid crystal modulator mounted adjacent said first and second modulators in a plane perpendicular to said first and second planes, said modulators being adapted to receive first, second and third input beams of mutually different colors respectively and to pass first, second and third modulated beams of said colors respectively, first dichroic filter means (DF3) positioned between said first and second modulators, first folding mirror means (FM3) for reflecting said first beam along the Y axis to and through said first dichroic filter means, said first dichroic filter means being positioned to reflect said second modulated beam along the Y axis is coincidence with the first modulated beam transmitted along the Y axis to provide a two color beam along the Y axis, second dichroic filter means (DF4) configured and arranged to reflect said two color beam along the Z axis, said second dichroic filter means being positioned to receive and transmit said third modulated beam to provide a three color beam along said Z axis to transmit a three color beam as an exit beam of the multiplexer along the Z axis.

* * * * *